Figure 1:
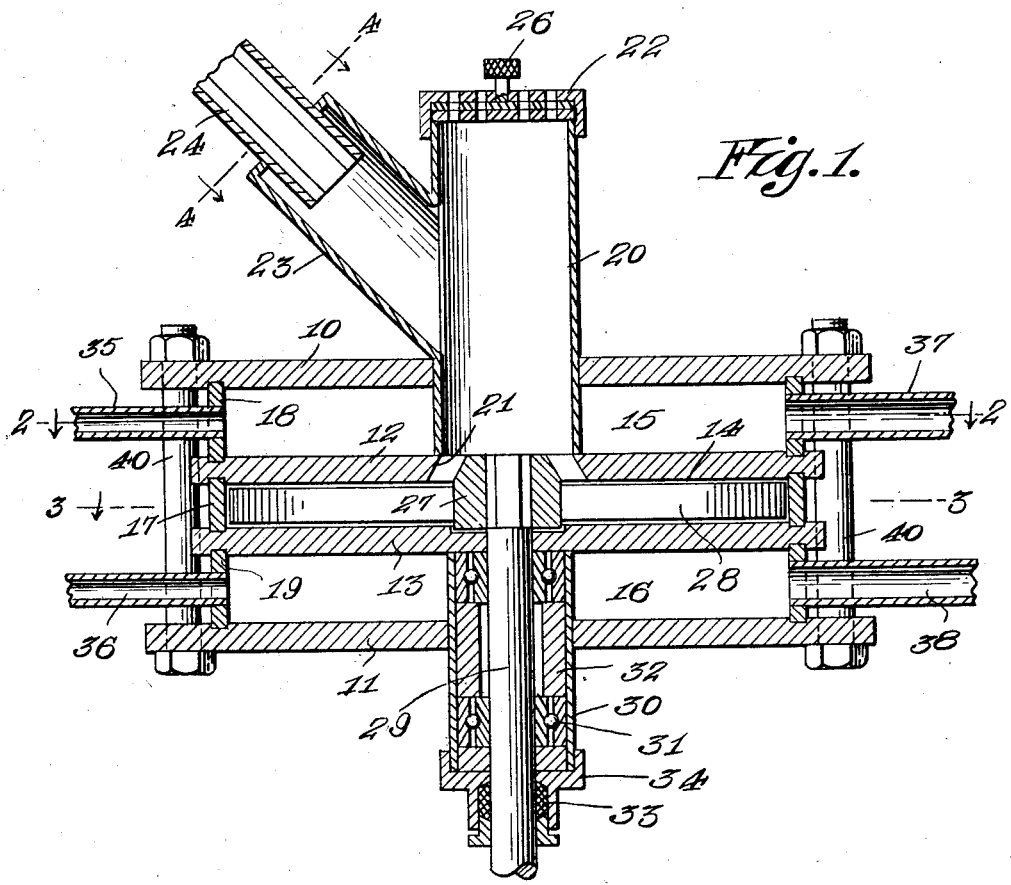

May 31, 1932.  J. A. CONGLETON ET AL  1,861,301

FREEZER

Filed Feb. 2, 1931  2 Sheets-Sheet 1

J. A. Congleton,
Oscar Kelly,
INVENTOR

May 31, 1932. J. A. CONGLETON ET AL 1,861,301
FREEZER
Filed Feb. 2, 1931    2 Sheets-Sheet 2
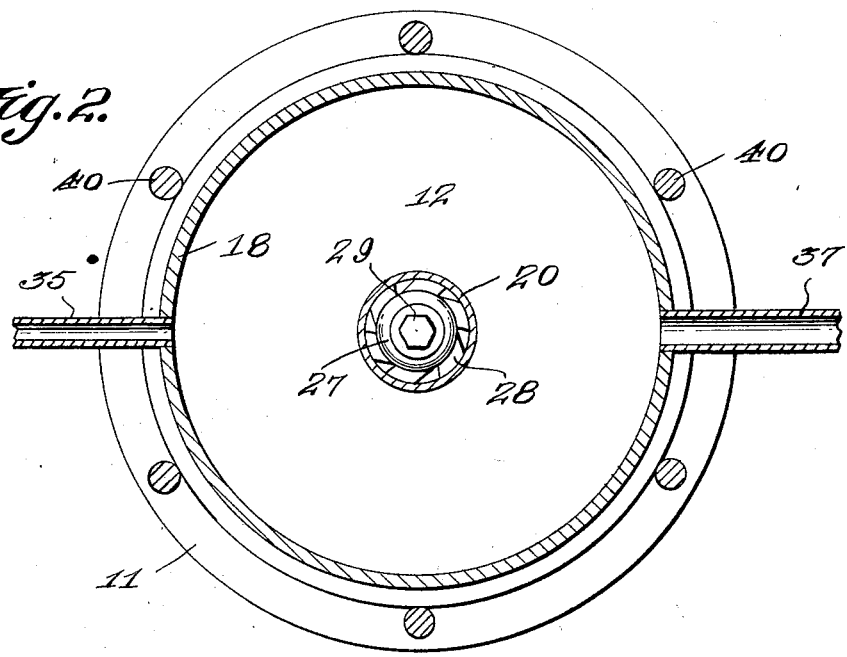
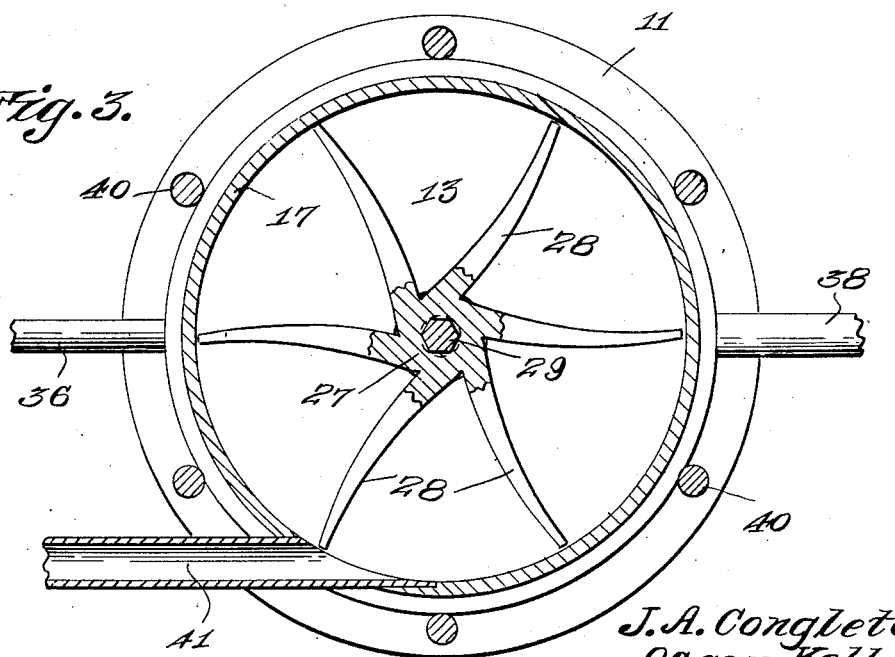
J. A. Congleton,
Oscar Kelly,
INVENTOR
BY Victor J. Evans
and A. L. Evans ATTORNEYS Patented May 31, 1932

1,861,301

UNITED STATES PATENT OFFICE

JOHN A. CONGLETON AND OSCAR KELLY, OF DALLAS, TEXAS

FREEZER

Application filed February 2, 1931. Serial No. 513,004.

This invention relates to freezers for use in freezing such food products as ice cream, ices, custards and the like, an object being to provide a freezer for this purpose through which the material to be frozen may be passed, with the freezing action occurring during such passage, so that a continuous freezing of the food products will occur.

Another object of the invention is the provision of a device of the above character which will freeze fruits and other solids mixed with liquids, and will freeze the mixture continuously with the liquids and solids evenly mixed and without crushing the latter.

Another object of the invention is the provision of a device which in addition to the above and other advantageous features, is simple and inexpensive in construction, reliable and efficient in use, and may be readily taken apart and reassembled for cleaning and repair.

With the above and other objects in view, the invention further includes the following novel features and details of construction, to be hereinafter more fully described, illustrated in the accompanying drawings and pointed out in the appended claims.

In the drawings:—

Figure 1 is a sectional view illustrating the invention.

Figure 4:
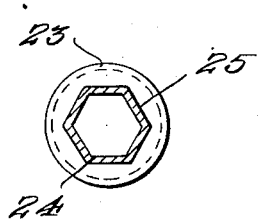

Figures 2, 3 and 4 are sections taken respectively on the lines 2—2, 3—3 and 4—4 of Figure 1.

Referring to the drawings in detail wherein like characters of reference denote corresponding parts, the invention as illustrated comprises a housing which includes top and bottom plates 10 and 11 respectively and partition plates 12 and 13, the latter being spaced apart and providing together with the plates 10 and 11, and sectional side walls, an intermediate freezing chamber 14, and expansion chambers 15 and 16 upon opposite sides thereof, which may be insulated on the outside.

The side walls are of sectional formation and comprise annular sections 17, 18 and 19, the section 17 providing one of the walls of the freezing chamber 14 whose other walls are provided by the partitions 12 and 13, while the sections 18 and 19 form one of the walls of the expansion chambers 15 and 16 respectively.

The material to be frozen is fed to the freezing chamber through a combined air inlet and material feed pipe 20, whose inner end communicates with an opening 21 provided in the partition plate 12. The outer end of this pipe is provided with a valve 22 to control the admission of air. A branch pipe 23 communicates with the pipe 20 and this pipe 23 has a sliding connection with a pipe 24 which may lead from a suitable source of material supply. As shown in Figure 4 of the drawings the pipe 24 and the opening 25 in the outer end of the extension 23 are of angular cross sectional shape, so that relative longitudinal movement between the pipes 23 and 24 may be permitted, but relative rotary movement prevented. An operating member 26 is provided for the operation of the valve 22.

Mounted for rotation within the freezing chamber is an agitator which comprises a hub 27 with a plurality of fingers 28, the latter being spaced from the walls of the chamber 14 to provide space for the material to be frozen.

The agitator is rotatable with the shaft 29 which operates within a sleeve 30 which extends from the plate 11 and this sleeve 30 accommodates anti-friction bearings 31 which are spaced apart by means of a sleeve 32. The shaft 28 extends through a packing gland 33 which is carried by a cap 34 applied to the sleeve 30.

Communicating with the chambers 15 and 16 respectively are pipes 35 and 36. These pipes are adapted to supply a suitable refrigerant, such as ammonia or any other refrigerant, to the expansion chambers 15 and 16 and this refrigerant is drawn from said chambers through suction lines 37 and 38.

The housing may be quickly taken apart and reassembled for the purpose of cleaning and repair, and in order to hold the parts assembled, the wall sections 17, 18 and 19 are seated within annular grooves 30 provided in the plates 10, 11, 12 and 13, while the plates 10 and 11 extend beyond the annular wall sections and are provided with openings for the passage of clamping bolts 40.

The freezing chamber 14 is in communication with a discharge pipe 41 for the passage of the frozen product.

These freezers may also be used in gangs or stages, the chamber of one discharging into the suction of the next, through each successive stage, and the right of coupling into stages is herein reserved.

The invention is susceptible of various changes in its form, proportions and minor details of construction and the right is herein reserved to make such changes as properly fall within the scope of the appended claims.

Having described the invention what is claimed is:—

1. In a freezer, a housing, partitions within said housing dividing the latter into a freezing chamber and expansion chambers upon opposite sides of the freezing chamber, means providing for the passage of a refrigerant through the expansion chambers, an agitator movable within the freezing chamber, means to supply material to the freezing chamber to be frozen, and a controllable air inlet for the freezing chamber.

2. In a freezer, a housing, partitions within the housing dividing the latter into a freezing chamber and expansion chambers upon opposite sides of the freezing chamber means providing for the passage of a refrigerant through the expansion chambers, an agitator movable within the freezing chamber, and a combined air inlet and material feed pipe for the freezing chamber.

3. In a freezer, a housing, partitions within said housing dividing the latter into a freezing chamber and expansion chambers upon opposite sides of the freezing chamber a refrigerant supply pipe for each expansion chamber, refrigerant outlet pipes for said expansion chamber, an agitator movable within the freezing chamber, means to supply material to the freezing chamber to be frozen, and a controllable air inlet for the freezing chamber.

4. In a freezer, a housing including separate annular wall sections, top and bottom plates, spaced partition plates arranged between the annular wall sections and dividing the housing into a freezing chamber and expansion chambers upon opposite sides of the freezing chamber, said plates having annular grooves therein to receive the annular wall sections, bolts connecting the top and bottom plates to hold the parts assembled, means providing for the passage of a refrigerant through the expansion chambers, an agitator movable within the freezing chamber, and a combined air inlet and material feed pipe for the freezing chamber.

In testimony whereof we affix our signatures.

JOHN A. CONGLETON.
OSCAR KELLY.